July 4, 1967 H. SVANOE 3,328,972
CONCENTRATION OF EXTRACTS BY FREEZING
Original Filed July 25, 1963
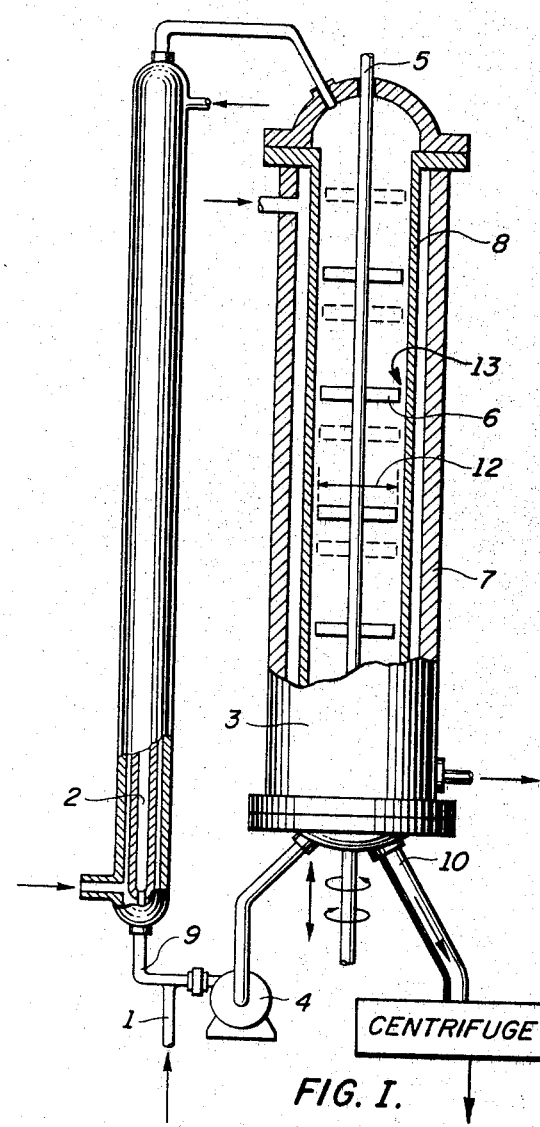
FIG. I.
FIG. II.
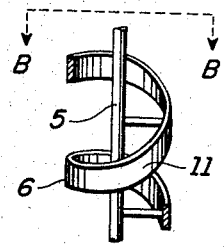
FIG. IIIA.
FIG. IIIB.
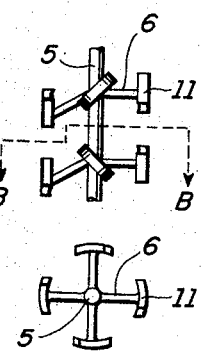
FIG. IVA.
FIG. IVB.
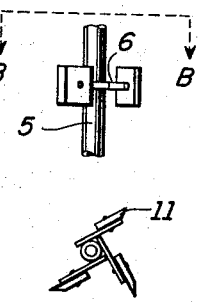
FIG. VA.
FIG. VB.
INVENTOR.
HANS SVANOE
BY
ATTORNEY

United States Patent Office 3,328,972
Patented July 4, 1967

3,328,972
CONCENTRATION OF EXTRACTS BY FREEZING
Hans Svanoe, Warren, Pa., assignor to Struthers Scientific and International Corporation, New York, N.Y., a corporation of Delaware
Continuation of application Ser. No. 297,498, July 25, 1963, now Patent No. 3,209,378. This application Aug. 9, 1966, Ser. No. 571,358
1 Claim. (Cl. 62—123)

This application is a continuation-in-part of the Hans Svanoe application Ser. No. 235,555, filed Nov. 5, 1962, and a continuation of application Ser. No. 297,498, filed July 25, 1963, now Patent No. 3,209,378.

The invention relates to a process for the concentration of comestible and potable extracts by crystallization and more particularly relates to freezing aqueous solutions containing flavors to concentrated extracts while removing the water through crystallization.

The prior art describes processes in which the solvent in various solutions is frozen and the resulting crystals separated, thus either concentrating the solution or liberating the solvent from the solution for subsequent use for food or drink. In carrying out such processes of the art, the solution may be placed in contact with a heat transfer surface such, for example, as the external surface of an internally cooled drum which is immersed in the solution to be concentrated, or the internal heat transfer surface of an externally cooled cylinder. The solvents of the solutions, under prescribed conditions, are frozen out of the solutions on the heat transfer surfaces and by one means or another the frozen solvent scraped from the heat transfer surfaces. Other methods have been disclosed for the removal of solvents by crystallizations in which particles of an insoluble solid, cooled below the freezing point of the solution are continuously introduced into the solution, the particles incased in the frozen solvent and continuously removed from the solution. Contrariwise droplets of an organic refrigerant are forced into a solution and the solvent therein frozen out by the latent heat of evaporation, released in situ, of the refrigerant. After thus removing the frozen solvent and extracting its heat of crystallization, the particles or droplets are again treated to effect the freezing of the solvent and the operation repeated.

In the processes of the art such as those described above, efficient operation suffers due to the unconscionable amount of the concentrate lost in the crystals comminuted by scraping during removal from the heat transfer surfaces. Heat transfer losses due to the ice coating on the surfaces are also high. Recovery of the concentrate, occluded or retained on the ice, by washing, extraction, or other means invariably dissolves the small crystals, thus diluting the concentrate and lowering the yield. The process of the invention obviates these and other difficulties and advances the art of concentrating a solute by removing the solvent by an improved cooling, crystallization, and crystal growth process.

Objects of the invention include: an improved process for the concentration of potable concentrates and for the concentration of palatable liquids by a controlled crystallization process; the crystallization and environmental control of such processes to produce dense ice crystals from fruit, vegetables, bean, and comestible extracts and the like; the maintenance of a non-crystallizing refrigeration environment in which to provide the sub-cooling of dilute potable liquids and comestible extracts and a crystallization environment for the nucleation and growth of crystals resulting therefrom; the concentration of solutes by freezing and the improved process of separating concentrated extracts from ice. Other objects and advantages of the invention will hereinafter appear.

The invention will be more readily understood by reference to the attached drawings in which like parts have like numbers throughout.

FIG. I represents, diagrammatically and in partial cutaway section, in an elevation view, a crystallizer and crystal growth zone in which the process of the invention is conducted.

FIG. II represents, in plan view the form and shape of the agitators used in the crystallization zone represented in the elevation of FIG. I.

FIGS. IIIA and B, FIGS. IVA and B and FIGS. VA and B represent in elevation and plan views embodiments of types of agitators that are used in accordance with the invention.

In a general sense the invention is directed to a process for the concentration of a solute in a solvent therefor, e.g., a coffee extract, by the removal of the solvent by freezing. A slurry containing a solute, solvent, and crystals of the solvent is circulated in a closed cycle, such as is illustrated in FIG. I or alternatively may be passed through a single crystallizer without recycling or through a plurality of crystallizers in series depending on the amount of concentration desired. A feed of a dilute solution of the solute is fed into the circulating slurry. The augmented and diluted slurry is passed through a sub-cooling zone aid, if desired, a separate crystallization zone of the cycle. The sub-cooling of the dilute solution is effected in a confined area, hereinafter referred to as a boundary film, an area that is formed between an agitator periphery, and a metal cooling surface, the sub-cooling being effected in such a way that the boundary film is maintained at a temperature below the freezing point of the solution placed therein and importantly subjected to sufficient intensity of tubulence that on the one hand the film of solution is sub-cooled to a temperature below its freezing point and on the other the sub-cooling of the solution is not released in the boundary film as heat of crystallization. The sub-cooling on the contrary is released as the heat of crystallization outside the boundary film, as crystals of the solvent tnd as crystal growth. The dilute solvent feed is continuously introduced into the crystallization zone, the solvent concentrated by crystal growth and the concentrated extract removed.

An embodiment of the invention constitutes passing the dilute solution into an apparatus, such as that illustrated in FIG. I, through inlet 1 and into the circulating slurry of the solution and crystals thereof flowing in conduit 9. The slurry contains a solution (of the extract to be concentrated), the solute and crystals of the solvent. The slurry passes into zone 2 then into the heat exchanger (referred to more specifically below) and crystallizer 3 and pump 4, the latter forcing the slurry continuously through the crystallizer at a desired velocity. A propeller shaft 5 is centered in crystallizer 3 to which are fixed agitators 6. As the slurry with its load of feed passes into crystallizer 3 it meets the slurry therein which is in a state of turbulence. Agitators 6 are so constructed and arranged and are so rotated and also so propelled in vertical directions by propeller shaft 5 that the boundary film, i.e., the layer of liquid proximate to the inside wall of the crystallizer is in a state of turbulence which will be more fully particularized hereinafter. Between the outer wall of the crystallizer 7 and the flowing slurry is a heat transfer surface 8. A fluid refrigerant or a film of an evaporating refrigerant of any suitable kind flows at a sufficient temperature to refrigerate (by indirect heat exchange) and sub-cool the solvents in the film, i.e., lower the temperature below the freezing point of the solution in the film. The removal of the heat of crystallization and the removal of the necessary heat to maintain the temperature of the slurry at the proper freezing temperature is carried by the sub-cooled solvent to zone 12. A slurry containing, inter alia, the concentrated solution is withdrawn from crystallizer 3 through outlet 10, the crystal content separated therefrom and the concentrate sent to storage.

An important feature of the invention is the creation of and maintenance of the boundary film. It is well known (cf. Principles of Chem. Eng., Walker, Lewis and McAdams, 1923, p. 134) that "When a liquid is in contact with a solid there is strong evidence to show the presence of an adhering relatively stationary film of fluid on the surface of the solid, a film that becomes thinner as the velocity of the fluid parallel to the surface increases, but which breaks away from the solid only at very high velocities, if at all." Applicant has found that during the concentration of a solution by freezing by prior art processes crystals are generated in the "stationary film." If, he reasoned, crystal generation could be prevented while at the same time the solution be properly refrigerated by indirect heat exchange, many of the difficulties encountered by the prior art should be eliminated. By extensive research crystal generation has been eliminated in the film and the crystallization transferred to the crystallization and crystal growing zones from which the crystals can easily be withdrawn. Contrariwise the crude and awkward mechanical means of the art invariably require the use of scrapers or other means of removing the crystals from the heat transfer surfaces to which they are prone to adhere so tenaciously. The resulting comminution of the crystals by the scrapers occludes the solution being concentrated. Frequent complete freeze up of apparatus used in the art points up, with the difficulties described supra, the problems the process of the invention avoids.

Alexander Findley states in "The Phase Rule" (9th ed., Dover Pub., p. 45), "It is a matter of everyday experience that crystallization can be induced by scratching the inside of the containing vessel with a glass rod." While, therefore, scrapers remove the crystals from the walls, they continuously produce more and more loci at which crystals will form on the heat exchange surfaces thus greatly increasing the problem. The process and apparatus of the invention avoids such multifarious chain-like duplication of crystallization on the heat transfer surfaces where no such crystallization can be tolerated.

In accordance with the invention, means are provided to subject the boundary film to sub-cooling and to intense turbulence that prevents the formation of crystals on the heat exchange surface although normally crystallization would occur with or without scraping under such sub-cooling. Agitators are provided in the crystallization zone the periphery of each is surrounded by and defines the inner limits of the boundary zone. The O.D. of the boundary zone is defined by the I.D. of the heat transfer surface. The agitators whip into and disturb the continuity of the film of the boundary zone without touching the heat exchange surface.

In a broad sense one feature of the invention comprises a process of continuously introducing a dilute extract, undercooled below its freezing point and within the metastable state, into a concentrating extract and ice slurry, releasing the undercooling to heat of crystallization in growth of ice on the crystals present in the slurry and thereby concentrating the extract. The water in the extract is changed from a liquid phase solvent to a solid phase non-solvent by growth of ice on the ice crystals present in the slurry, thus expanding the size of the crystals and concentrating the extract. By maintaining carefully controlled conditions during the heat transfer and undercooling, dense pure ice crystals are formed without occlusion of the solute. Moreover, the solute retained on the surface of the crystals can be readily washed from the crystals after their separation from the concentrated extract.

Any suitable type of agitator or equivalent propeller-like device may be used to create turbulence in the boundary film such, for example, as the propellers of the drawings. The propeller of FIG. I (and FIG. II), fits snugly in the crystallizer with a free clearance between its periphery and the I.D. heat exchanger surface. The clearance should be adjusted with the r.p.m. and the vertical up and down strokes of propeller shaft 5 in order to provide turbulence in the total boundary film on the heat exchange surface. With the propeller illustrated in FIG. I a clearance of less than 0.1 inch is adequate when the agitators of FIG. V are used and given a partial rotation of 120° clockwise and then 120° counter clockwise, the full cycle being repeated 50 to 100 times per minute. When these or the other agitators described in the drawing are used with vertical strokes combined with partial or complete rotation with or without reversal deposition of crystals is completely inhibited.

The type of solution being concentrated should also be taken into consideration together with its viscosity when determining the amount of turbulence. The above operations will provide turbulence adequate for concentrating, for example, a 10% to 35% coffee extract. With a more concentrated solution, increase in turbulence is recommended and with a more dilute solution a decrease in the turbulence. As a consequence the propeller shaft is controlled by variable speed motors or like device, not shown in the drawings, which can be adjusted to accomplish the desired r.p.m. and speed of stroke. Moreover, it has been found that the more violent turbulence is mostly a matter of power economy. Accordingly when starting up a high degree of turbulence is used to avoid all possibility of crystal formation on the heat transfer surfaces. Thereafter the turbulence may be gradually reduced to conserve power consumption, down to a safe/non-crystal forming turbulence.

FIG. III represents, by elevation and plan views, another type of propeller. The ribbon-like blade 11 may be segmented or may extend continuously from the top to the bottom of the crystallizer. The propellers and the angular setting of the blades in FIGS. III and IV are but examples of propellers and their angulation that may be used in the process of the invention. The plan views of FIGS. III, IV, and V are taken from the dotted positions indicated on the elevations.

The following examples illustrate specific embodiments of the invention in which parts are by weight unless otherwise noted:

EXAMPLE I

A coffee brew containing 10% of coffee cooled to around 0° C. is passed into a slurry flowing in an apparatus such as that illustrated by FIG. I. The slurry in conduit 9 contains from about 12% to less than about 15% coffee in an aqueous solution and also from about 15% to about 35% ice crystals. Heat transfer surface is provided in the crystallizer, to the extent of 80 to 300 square feet per 1,000 pounds of ice crystals to be formed from the brew per hour. Refrigerating brine is passed through the crystallizer cooling jacket to establish a crystal forming temperature of not more than about 1° C. below the freezing point of the brew. The O.D. of each propeller is 0.2″ less than the I.D. of the heat exchange surface thus giving an annulus boundary lay zone having an r—r equal to 0.1 inch. The propeller shaft is rotated at from 30 to 100 r.p.m. and given an up and down stroke, of at least the distance between the propellers, at a rate of 2 or more per minute. Slurry is bled from the crystallizer. Coffee extract concentrated to about 15% is separated from the ice crystals in the slurry by centrifuging and either sent to storage or to another crystallizer to further concentrate the extract. The ice crystals are washed with cool water or dilute coffee extract and the wash water returned to the cycle.

EXAMPLE II

Coffee extract is concentrated from 10% to about 45% in from 3 to 6 stages depending on the size of capacity of the installation. In the first stage a 10% coffee solution is concentrated to 15% in accord, except for the recycle means, with the process of Example I. The centrifuged 15% coffee extract slurried with 20% to 40% ice are passed into and through a second stage and subjected to similar boundary film sub-cooling and crystallization in the central zone of the second crystallizer and concentrated to about 20%. In like manner the extract is concentrated in the desired number of incremental stages until the final concentration of 45% is attained in the last stage in which the crystallization zone temperature will range between from —5° C. to —6° C. The slurry in each stage contains from about 20% to 40% ice; the temperature of each stage is adjusted to optimum crystallization temperature commensurate with the freezing point of the extract, as herein prescribed; the more concentrated extract of each stage is centrifuged before transfer to the next succeeding stage; and the wash water of each stage recycled through the same or an earlier stage.

EXAMPLE III

Orange juice, concentrated for use in preparing frozen juice, is prepared by squeezing oranges followed by customary separation of the pulp and concentrating the juice by the following process. The expressed juice containing about 12% solids, as feed, is chilled to about 0° C., is passed through inlet (1) FIG. I into a slurry containing from 20% to 40% ice and about 40% solution of orange juice and the resulting slurry subjected to subcooling below the freezing point of the solution, i.e. to about —8° C. The subcooling is effected in the boundary film extract and the extract transferred by turbulence from the boundary layer to the crystallizer for release of the subcooling by crystal growth on the crystals in the slurry. The concentrated extract is separated by centrifuging; the crystals washed with dilute orange juice and the resulting wash water returned to the crystallizer with the feed.

The process of the invention is used to freeze ice from an extract, to utilize concurrently the phase change by means of which water in the form of ice is withdrawn from the extract leaving a concentrate (or mother liquor) and thereafter to separate the ice from the concentrate. Indirect heat exchange of the art produces, as we have seen, ice build-up on heat exchange surfaces that are in contact with the extract. Applicant has discovered that a combination of factors is important in order to maintain high equipment capacity, to insure continuous operation, and to sustain relatively high temperature differences between the cooling medium and the extract being concentrated. Moreover, the process restricts ice formation exclusively to crystal growth on free, i.e., ambulatory nuclei, thus avoiding build-up on heat transfer surfaces. The combination of factors include:

(1) The liquid extract film in immediate contact with the heat transmission surface in the freezing zone is subjected to a relatively high degree of subcooling i.e. 3 to 8° C. or more below solution freezing point. During contact the potential ice formation in the form of nuclei is maximum. Even a slight deposit of ice on the heat transfer cooling surfaces cannot be tolerated and by rotating the agitators and reversing their vertical travel at respectively sufficient r.p.m. and rates deposition is avoided.

(2) The ice crystal concentration in the crystallization zones is maintained between about 15% and 40% by weight. This concentration is required in order to give a high growth rate of the ice and to insure that sub-cooling is released on crystals in that zone and that the formation of new crystals, or nuclei, are confined to that zone and to the crystals in that zone.

(3) The total volume of crystals available for crystallization within the freezing zone is sufficient to reduce substantially the supercooling within the zone and to maintain the supercooling within 1° C. and preferably les than 0.5° C. below the freezing point of the extract which may be at a temperature as low as —15° C. or lower depending on the kind of extract being frozen. This is achieved by using from 50 to 500 gals. of slurry volume for 1000 lbs. of crystals produced per hour. About 200 gals. of volume is provided within the freezing zone per 1000 lbs. of crystals produced per hour for solution of medium viscosity.

(4) The freezing, or heat transfer, surfaces are preferably highly polished and are made of a non-corrosive material such for example, as stainless steel or silver, or are silver lined metal surfaces.

(5) Optimum operation involves effective motion in the extract and slurry to sub-cool the extract in the boundary film, to withdraw the sub-cooled uncrystallized extract from the boundary film, to associate the sub-cooled film with crystals in the slurry of the crystallizer and out of contact with the heat transfer zone, and to permit ample time for release of the sub-cooling as crystal growth. These functions as have been herein stated are executed by the turbulence in the boundary film, by transporting the sub-cooled extract from the film to the crystallizing zone and by maintaining a spacially and temporally constant state in the latter zone until the sub-cooling has been released. Action of the agitators and especially their reversal of direction, coacting with a moderation of through-put of the slurry, controls the duration of the extract boundary layer contact time and also the state and association of the sub-cooled extract with the crystals in the slurry to complete release of the sub-cooling. Optimum results with continuous operation of the process is thus effected.

Applicant has found that boundary film turbulence can be provided in various ways, for example, by reversing the direction of motion of the propellers such as in a partial or complete clockwise, followed by like counterclockwise rotation of the shaft and attached propellers; the clockwise, counterclockwise cycle being repeated 50 to 150 times per minute. These motions can be augmented by the vertical up/down motion of the shaft to insure film turbulence and crystallizer constant environment, the through-put (velocity) of the slurry through the crystallizer in either an upward or downward direction being preferably continuous and may vary from a few feet per second down to a fraction of a foot per second.

Not only is it important to have the nuclei present in the crystallizer, outside the boundary film, but also important that the number of nuclei and crystals should be capable of absorbing the sub-cooling and in position to absorb the heat of crystal formation and of crystal growth. Optimum utilization of the invention involves having the crystals present in quantity and sub-cooling at the allowable maximum distributed temporally and spacially in the crystal forming zone of the crystallizer. Uniform distribution of crystals in zone 12 is induced by a turbulent state which avoids loci crystallization, i.e., points of crystallization as the sharp corners of the equipment, rough surfaces, and other possible crystal forming protuberances of the propeller surfaces. Suitable turbulence to give the spacial (and temporal) requirements in zone 12, as well as in the boundary film, is attained by the action of the agitators or equivalent means is at least ample, taking into consideration the configuration, size, fluid-solid flow (slurry flow), viscosity of the extract and other essential chemical engineering factors to provide turbulent state flow velocities (i.e. critical velocities) in the boundary film and in zone 12. By the provision of crystals within the crystallizer and their uniform distribution, as well as means for introducing additional crystals at suitable positions in the crystallizer at any suitable point at which surface crystallization might otherwise occur, the ice crystals are held in suspension throughout zone 12 with substantially free flow through the crystallizer.

Crystals introduced not only grow within the crystallizing extract by release of the heat of sub-cooling but also produce the desired crystal form and habit. The recycled crystals should be compact in density and discrete in association in order to be separated readily by centrifuge or other means from the adhering concentrate. The natural tendency is for water and also extracts to form ice at very rapid rates and to form ice as snow-like crystals. Such crystals in contradistinction to the crystals produced by the process of the invention are neither compact in density nor discrete in character; and moreover, snow-like crystals occlude and tenaciously hold and retain undesirable amounts of concentrate when such crystals are produced in concentrating extracts.

Discrete ice crystals are produced in accord with the invention by nucleating and growing the crystals under a restricted range of temperatures. The temperature in the crystallizing extract in zone 12 is held within a narrow temperature range that is below the freezing temperature of the concentrating solution. This temperature is below 0° C. and is maintained practically constant at a temperature about 1° to 0.1° C. below the freezing point of the particular extract, determined by the sub-cooling in the boundary film (which may be many degrees below the solution freezing point), other cooling means may be provided. Dense crystals are created by holding the temperature difference between the heat transfer surface and the equilibrium freezing point of the extract such that between 300 to 1600 B.t.u. per square foot hour is transferred through the heat transfer surface and from the sub-cooled film to zone 12.

The form, discretion, and habit of the crystals follow closely the precision with which the constancy is maintained during crystallization. Compact and dense crystals produced by a temporal and spacially constant environment are more readily washed free of concentrated extract. With optimum control of the heat transfer surface temperature under the preferred conditions discrete crystals are produced from aqueous extracts that are hexagonal, are of the ditrigonal-pyramidal class and have the compact dense form most favorable for washing to recover adhering concentrate without undue melting of the ice during the washing step. In the specification and claim by the phrase equilibrium temperature of the freezing extract is meant the average crystallization end point of the extract. Optimum capacity is obtained by adjusting the heat flow to decrease the temperature at any one freezing stage commensurate with the increase in concentration of the extract. The temperature decrease is produced by known means such for example as by lowering the pressure on the refrigerant if ammonia or an equivalent vaporizable refrigerant liquid is used or decreasing the temperature of non-volatile coolants such as brine or a halogenated hydrocarbon which is circulated through the cooling jackets.

The process is operated by introducing an extract precooled to a temperature approaching 0° C. into the circulating slurry. Any extract, for example, fruit juices as treated such as: orange, lemon, pear, grape, apple, and guinabana; potable liquors i.e. milk, wine, coffee, beer, vegetable juices, e.g. tomato, carrot, cabbage, onion, and beet; and other comestible extractions containing potable liquids and also brackish and saline water or other organic or inorganic substances.

Multi-effect or stepwise concentration is indicated in the concentration of those extracts that are dilute or for those to be dehydrated. The temperature in the different effects as well as the number of effects employed are dependent on the percentage concentration of the juice desired in the product concentrate. For example, in the preparation of a final orange juice concentrate containing 50% solids by weight, and using three effects, recommended temperatures in zone 12 of the crystallizers are: first effect minus 3° C.; second effect minus 8° C.; and the third effect minus 12° C. In relatively large installations four or even more effects can be used. For relatively small production many stages are not usually justified, due to the cost of extra piping and auxiliary equipment required.

The centrifuged discrete crystals are preferably freed from adhering concentrate by washing with extract feed precooled to a temperature below about 1° C. and/or temperature controlled water which wash water extract is added to feed to recover extract otherwise retained on the crystals. The crystals in the slurry should on the one hand be sufficient in quantity to provide points of crystallization throughout zone 12 for release of the heat of crystallization (sub-cooling) in the formation of discrete ice crystals. Too great a quantity of crystals will result in too many crystals of undesirable size. By restricting the number of crystals the sub-cooling will be released in producing large crystals and not in producing an equivalent weight of small crystals. The number of nuclei should therefore be less than the number that will produce crystals having an average size of less than about 0.2 mm., which is the minimum size for efficient handling and washing of the crystals. Crystals are preferably much larger .5 to .8 mm. or more.

Efficient concentration of comestible, imbibable, and other extracts by the process of the invention stems inter alia from the formation during the concentration of granular ice crystals having a high bulk density. Water of course will crystallize in the form of snow-like crystals having an extremely low bulk density. Snow-like crystals will hold tenaciously any retained extract or concentrated solute. An economical process for the concentration of the solutions described herein is operated under close tolerance that avoid the formation of snow-like crystals. Moreover, the sub-cooling is imparted to the extract while the extract is in the boundary film and that sub-cooling released in forming crystals and growing them in intimate contact with the suspended crystals. Furthermore, as crystals are formed and grown the concentration is carried out under strict control of temperature. Moreover, crystals are produced as discrete particles and are subjected to crystal growth also under precise control and importantly in the practical absence of localized heating and cooling effect due respectively to controlled introduction of the extract and controlled use of the refrigerant.

The process, apparatus, and conditions described may be modified in many ways within the purview of the invention as herein disclosed and claimed without departing from the invention or without operating outside the scope of the claim.

I claim:

Apparatus for the concentration of solute in a solvent by crystallization of solvent into solid crystal form, comprising:

(1) a crystallizer comprising a cylindrical jacketed heat transfer surface having an inlet portion and an outlet portion;

(2) agitation means comprising a rotatable shaft, adapted for periodic reversal of direction and for oscillation parallel to the axis of said cylindrical heat transfer surface, provided with a plurality of agitators extending therefrom, and arranged to define an apparatus free zone adjacent said heat transfer surface, and a crystal forming zone adjacent said apparatus free zone, said agitation means adapted to create turbulence in said apparatus free zone so as to keep said heat transfer surface free from solids;

(3) means for feeding solution into said crystallizer through said inlet portion; and (4) means withdrawing crystals in slurry from said outlet portion of the crystallizer and returning recycle crystals in liquid slurry for introduction into said crystallizer inlet portion together with fresh solution.

References Cited

UNITED STATES PATENTS

| | | | |
|---|---|---|---|
| 1,996,988 | 4/1935 | Badger | 62—58 XR |
| 2,013,025 | 9/1935 | Bottoms | 62—58 X |
| 2,119,182 | 5/1938 | Schuftan | 62—58 |
| 2,559,204 | 7/1951 | Wenzelberger | 62—58 |
| 2,657,555 | 11/1953 | Wenzelberger | 62—58 |
| 2,685,783 | 8/1953 | Benscheidt | 62—58 |
| 2,764,488 | 9/1956 | Slattery | 62—58 |
| 2,896,419 | 7/1959 | Thompson | 62—58 |

NORMAN YUDKOFF, *Primary Examiner.*

G. P. HINES, *Examiner.*

UNITED STATES PATENT OFFICE
CERTIFICATE OF CORRECTION

Patent No. 3,328,972                      July 4, 1967

Hans Svanoe

It is certified that error appears in the above identified patent and that said Letters Patent are hereby corrected as shown below:

Column 1, line 11, beginning with "This" cancel all to and including "3,209,378." in line 14, same column 1, and insert -- This application is a continuation-in-part of the Hans Svanoe application Ser. No. 235,355, filed Nov. 5, 1962, now U.S. Patent No. 3,285,021, and a continuation of application Ser. No. 297,498, filed July 25, 1963, now abandoned.

Signed and sealed this 4th day of November 1969.

(SEAL)
Attest:

Edward M. Fletcher, Jr.
Attesting Officer

WILLIAM E. SCHUYLER, JR.
Commissioner of Patents